(12) United States Patent
Kantor et al.

(10) Patent No.: US 11,920,004 B2
(45) Date of Patent: Mar. 5, 2024

(54) HYBRID PROCESSING OF WASTE MATERIAL

(71) Applicant: Environmental Waste International, Inc., Ajax (CA)

(72) Inventors: Steven L. Kantor, Oshawa (CA); Farzin Rajabi, Vancouver (CA); Paul S. Weinwurm, Lindsay (CA)

(73) Assignee: Environmental Waste International, Inc., Ajax (CA)

( * ) Notice: Subject to any disclaimer, the term of this patent is extended or adjusted under 35 U.S.C. 154(b) by 713 days.

(21) Appl. No.: 16/837,557

(22) Filed: Apr. 1, 2020

(65) Prior Publication Data

US 2021/0309824 A1 Oct. 7, 2021

(51) Int. Cl.
  *C08J 11/10* (2006.01)
  *B01J 19/12* (2006.01)

(52) U.S. Cl.
  CPC .............. *C08J 11/10* (2013.01); *B01J 19/126* (2013.01); *C08J 2321/00* (2013.01)

(58) Field of Classification Search
  CPC ........ C08J 11/10; C08J 2321/00; B01J 19/12; B01J 19/126
  See application file for complete search history.

(56) References Cited

U.S. PATENT DOCUMENTS 3,449,213 A  6/1969 Knapp et al.
3,996,022 A * 12/1976 Larsen ................... C10B 53/07
   44/605
4,647,443 A  3/1987 Apffel
4,686,007 A * 8/1987 Lyakhevich ............. B01J 19/22
   201/3

(Continued)

FOREIGN PATENT DOCUMENTS

CN  103359829  10/2013
CN  104723476  6/2015

(Continued)

*Primary Examiner* — Youngsul Jeong
(74) *Attorney, Agent, or Firm* — DLA Piper LLP (US)

(57) ABSTRACT

A system for processing rubber material pre-heats the material and then applies microwave energy to process the system The system comprising a rubber material receiver for accepting the rubber material which passes the material to a pre-heating unit adapted for the rubber material passing through comprising a plurality of heating elements that heat the rubber material to between about 100 to about 350 C in an oxygen depleted atmosphere. Once pre-heated, the material is conveyed to a microwave unit adapted for receiving the pre-heated rubber material comprising microwave magnetrons, which radiate the pre-heated rubber material and external heat sources in an oxygen depleted environment until the pre-heated rubber is substantially reduced to a carbonaceous material having a volatile content of below 5% and more preferably below 2%. After being processed by microwave energy, the processed material exits on a cooling conveyor that receives processed rubber material from the microwave unit and cools the material in an oxygen depleted environment. One or more conveyors are used to transport the rubber material from the rubber material receiver into and through the pre-heating unit and into and through the microwave unit to the cooling conveyor.

10 Claims, 1 Drawing Sheet

(56) References Cited

U.S. PATENT DOCUMENTS

| | | |
|---|---|---|
| 4,839,151 A | 6/1989 | Apffel |
| 5,057,189 A | 10/1991 | Apffel |
| 5,084,141 A * | 1/1992 | Holland ............... C10B 19/00 201/35 |
| 5,330,623 A | 7/1994 | Holland |
| 5,877,395 A | 3/1999 | Emery |
| 5,902,915 A | 5/1999 | Melnichuk et al. |
| 6,398,921 B1 | 6/2002 | Moraski |
| 7,028,623 B1 | 4/2006 | Pearson |
| 7,101,464 B1 | 9/2006 | Pringle |
| 7,361,303 B2 | 4/2008 | Kantor et al. |
| 8,354,005 B2 | 1/2013 | Kasin |
| 9,005,401 B2 | 4/2015 | Johnson |
| 9,649,613 B2 | 5/2017 | Kantor et al. |
| 2007/0102279 A1 | 5/2007 | Novak |
| 2008/0141589 A1 | 6/2008 | Farneman et al. |
| 2008/0226539 A1 | 9/2008 | Hong |
| 2008/0230365 A1 | 9/2008 | Bohr |
| 2009/0272028 A1 | 11/2009 | Drozd et al. |
| 2010/0230270 A1 | 9/2010 | Lee et al. |
| 2011/0171114 A1 | 7/2011 | Shaw |
| 2013/0174694 A1 | 7/2013 | Xu |
| 2013/0245345 A1 | 9/2013 | Hutchon |
| 2013/0256113 A1 | 10/2013 | Tumiatti et al. |
| 2014/0161681 A1 | 6/2014 | Gaga |

FOREIGN PATENT DOCUMENTS

| | | |
|---|---|---|
| CN | 105733644 | 7/2016 |
| EP | 1 413 826 | 4/2004 |

* cited by examiner

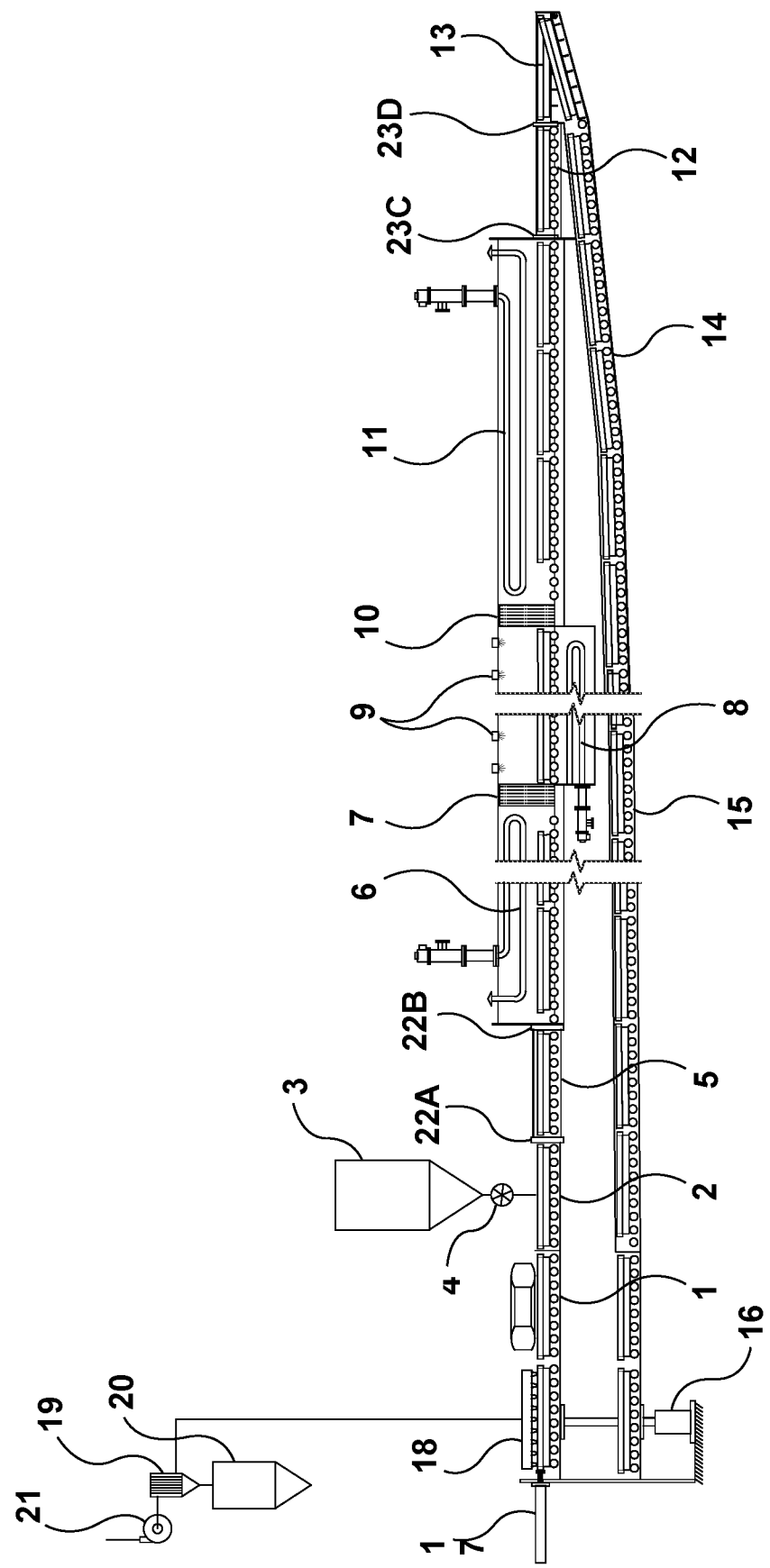

HYBRID PROCESSING OF WASTE MATERIAL

TECHNICAL FIELD

This invention relates to controlled reduction of organic material, more particularly, rubber based materials using heat and microwave radiation.

BACKGROUND

There are numerous instances where it is desirable that organic materials be reduced, decomposed or treated. Such a requirement may arise in the processing of raw materials, as, for example, in the extraction of oil from oil shales, or in the treatment of waste materials, such as worn out tires. The accumulation of such materials, for example in landfills or the like, contributes considerably to environmental pollution.

The processing of raw materials and the treatment of waste materials, such as by burning, may itself lead to environmental pollution problems. Furthermore, by-products of non-pyrolytic reduction of organic materials may be valuable as feedstock for other processes. For example, substantial amounts of the major components of tires, namely hydrocarbons (mainly oil and gas), carbon black and steel may be recycled.

Non-pyrolytic reduction of organic material may be accomplished by subjecting the materials to microwave radiation. For example, U.S. Pat. No. 5,877,395 issued Mar. 2, 1999 for a Method and Apparatus for the Controlled Reduction of Organic Material, which is incorporated herein by reference, describes a method and apparatus for the controlled non-pyrolytic reduction of organic material comprising subjecting the material to microwave radiation in a reducing atmosphere.

There is therefore an ongoing need for a more efficient and controllable process for the reduction or decomposition of organic materials.

BRIEF DESCRIPTION OF THE DRAWINGS

In drawings which illustrate by way of example only various embodiments of the disclosure The FIGURE is a schematic diagram of a processing system

DETAILED DESCRIPTION

The system and method described relates to the conversion of tires and other rubber based material into a carbonaceous material and other products by using a combination of heating and use of microwave energy in an oxygen depleted environment along with other aspects described. The rubber based material may be unvulcanised rubber, also known as green rubber.

The following is offered merely as one possible theory of the operation of the invention, without any representation as to its correctness or applicability. It is believed that microwave energy results in the severing of weaker molecular bonds in longer chain molecules to reduce those molecules to simpler forms. This is in effect a depolymerization process. Microwave energy is absorbed by the organic material, causing an increase in molecular vibration and straining inter-molecular bonds, leading to the generation of narrow band infrared energy. Narrow band infrared energy is re-adsorbed by surrounding material, increasing the amount of energy in the bonds until the bonds break. The breaking of the bonds results in the conversion of complex organic compounds into simpler compounds of lower molecular weight. Depolymerization using microwave energy may be much faster than pyrolysis and the conversion from long chain polymers to shorter chain molecules may be more extensive. It is believed that pre-heating of the material results in more efficient energy absorption of the microwave energy.

The system may generally be a single unit, either fixed or portable, for processing rubber material and generating carbonaceous material, non-condensable gaseous material and other products. As will be described in more detail, the system may comprise a number of modules that operate together as a system to achieve the benefits described.

The operation of the modules and the movement of the material through the modules may be controlled by one or more controllers, such as a programmable logic controller or other data processing apparatus. The flow of the material is controlled based on the quantity and quality of the rubber material, the temperature and atmospheric conditions in the pre-heating and microwave units and the output of the processed material through the cooling conveyor. The flow of the material is controlled to maintain the temperatures within appropriate ranges, as described below.

The rubber based material may be from used tires or preferably pieces from used tires. The rubber based material may be whole tires, broken, shredded or chipped tires, green rubber (non vulcanized rubber) or a combination.

Preferably the pieces of tire are less than 80 mm in the long dimension. Alternatively, rubber material may be shredded to pieces that may be less than 50 mm, prepared into chips that may be less than 20 mm, or prepared into crumb that may be less than 6 mm. If the internal cavity of a tire is eliminated the smaller rubber pieces may be easier to heat. Smaller pieces may also be easier to heat because of the larger surface area for a given volume. Cut tires may be used where the tires are cut in approximate halves to eliminate the internal cavity.

As the composition of the tires may be different for different manufacturers, using a mix of source rubber material may affect the final composition of the carbonaceous material. As it is preferred to achieve a substantially consistent and homogeneous product in the process, equipment like a multi-stage blending silo may be used to homogenize the finished product. Increased processing may increase the cost of equipment and facility footprint and therefore the overall cost of the process. Using whole tires as feed material may therefore make the process itself more complicated.

Whole tires may be dirty and may require cleaning or washing prior to being processed. Washing whole tires is typically expensive and time consuming. In addition, any washing materials, such as water, may also have to be processed before being discarded. Any water not removed prior to processing of rubber material, may be extracted with the gas emitted during the pre-heating and microwave processing. Having water mixed with the extract gas may make the oil more difficult to condense and separate and result in lower quality oil.

With reference to the FIGURE, rubber-based material may be fed into the system using a material feeding system. Different material feeding systems may be used. For example, a whole tire feeding section 1 may be for receiving whole tires into the system. In other examples, a shredded tire section 2 may receive material from a material hopper 3 via a feeding device 4. The material hopper 3 and feeding device 4 may be substituted with other systems, such as a conveyor. A combination of material may be processed together. For example, a tray, described in more detail below, may contain a whole tire as well as shredded material in the open space in the middle of the tire and surrounding space.

The rubber-based material is preferably loaded into one or more trays for carriage or movement through the different modules or system. The trays may be made of metal with walls and base sufficient to contain rubber-based material. The trays may be rectangular or other shape suitable to the nature, size and shape of the rubber-based material. As the trays support the material through the process, they are designed to withstand the temperatures and conditions, such as the temperatures described below.

By having the rubber-based material in a tray, the material is not physically disturbed as it is processed reducing the amount of dusty or other physical debris. This may result in less dust than if the rubber-based material flows through the system or is dumped onto or off of conveyors. Agitation of the material can cause increased dust.

The trays may be moved through the system using convoying means such as a push-in and/or push-out mechanism 17 as indicated in the FIGURE. The trays may alternatively or additionally propelled by means of chains, sprocket chains or cables or other suitable mechanisms. The consecutive trays may be connected together to form a train of trays or may be independent of each other.

The trays may include a glide mechanism to reduce the friction as the slide is moved through the system. The glide mechanism may be a low friction sliding surface, wheels mounted to each tray, rollers on which the trays are supported, a combination of mechanisms or similar.

Trays may also include means for identifying each tray, such as the application of a barcode or number. This allows a specific tray to be identified and tracked through the system process. This identification can be used to record the processing of the material, such as the weight of the material prior to processing as compared to the weight after processing. The processed material may be handled separately such as being segregated for different customers or by the source of the material.

The material is transferred through an isolating unit or isolating chamber 5, which isolates the external atmosphere from the other atmosphere inside the further chambers, particularly of oxygen. The isolation chamber 5 may be isolated with a rotary air lock, a double gate value, slide gate or similar mechanism, or combination of mechanisms. In the present example, the isolation chamber 5 is separated using isolation gates 22A and 22B. With the isolation gate 22B between the isolating unit and the rest of the processing modules closed, the isolating chamber 5 may for example accept a tray loaded with rubber-based material and then close the isolation gate 22A separating the isolating chamber 5 from the ambient atmosphere through which the tray passed. The atmosphere within the isolating chamber 5 containing the tray of rubber-based material is then purged such as by operating a vacuum pump and a purging inert gas. Once the pressure in the isolating chamber 5 has been reduced, the inert gas may be inserted to push the remaining atmosphere out. The oxygen in the chamber is preferably lowered to be less than about 1.0% or less than about 0.5%.

Preferably nitrogen or other inert gas is used to purge the atmosphere. Steam is less desirable as a purging material because water condensate may contaminate the hydrocarbons created by the process. The isolating unit may contain more than one purging chamber to drop the level of oxygen in the atmosphere surrounding a tray in more than one step. The isolating unit may purge the atmosphere around a single tray at a time or may be sufficient size to handle multiple trays simultaneously.

Once the purging process in the isolating unit is complete, the second gate may be opened to allow the tray to pass from the isolating unit to the pre-heating module 6.

The trays of material are transferred by a conveying means as described above to and through the pre-heating module 6.

The pre-heating module 6 may include one or more heating elements, such as a radiant heater to heat the material. Preferably the material is heated to approximately 100 C to approximately 150 C, approximately 150 C to approximately 200 C or more preferably approximately 200 C to approximately 250 C. Preferably the material is not combusted and is not heated over about 250 C or over about 350 C. The material may be heated such that it is not substantially broken down, charred or pyrolized although some material may be decomposed in the pre-heater. The temperature of the pre-heating module 6 may be selected based on the specific rubber-based material. For example, trays of the same type of rubber-based material may be transferred through the pre-heating module 6 operating at different temperatures to identify a preferred temperature for the particular material.

The pre-heating module 6 may use the burning of syngas, such as that generated in the processing module, or other heat source. Using steam heating is less desirable because water condensation may contaminate the hydrocarbon products created. If syngas is used, radiant fire tubes may be used to burn the gas with high efficiency burners and indirectly heat the material in the trays passing below, above or beside the fire tubes. The products of combustion of the syngas may be exhausted from the tubes into the plant exhaust system.

In some prior art systems, rubber material is heated to temperatures over about 600 C. In these systems, very high surface temperatures are required in the heating units for the system to transfer heat, via conduction or convection, to the surface of the material. This only indirectly heats the interior of the rubber material. The high temperatures can damage or reduce the life expectancy of components of the system and result in charring or pyrolysis of the rubber material as well as additional dust.

With regards to the current embodiments, as the materials breakdown in the process there may be a release of hydrocarbon vapours which increase the pressure of gases in the tunnel. The tunnel pressure is monitored and the gases are extracted through the condenser and scrubber with a blower or compressor to maintain the set point for tunnel pressure. The atmosphere in the pre-heater, in addition to being oxygen depleted, is preferably maintained just above atmospheric pressure, below 0.2 psi above atmospheric pressure, preferably below 0.1 psi above atmospheric pressure. Maintaining the pressure above ambient atmosphere reduces the amount of oxygen that may enter the system. Higher pressures in the pre-heating unit may be more difficult to maintain because of potential leaks and more complicated isolation units. The same or similar atmospheric conditions may be maintained in both the pre-hating unit and in the hybrid processing unit.

The pre-heated material in the trays may be transferred to the hybrid processing unit 8. In the present example, a partial heat barrier may be installed between pre het section and microwave. In addition, a second barrier may also be added between the microwave section and post heater unit 11 to improve control of the temperature and environment of each section.

Furthermore, a shielding unit 7 may be included prior to the hybrid processing unit 8 to block microwaves from passing into the pre-heating module 6. In addition, a shielding unit 10 may also be included after the hybrid processing unit 8 to block microwaves from passing into the post heater unit 11.

In the hybrid processing unit 8, microwaves generated by magnetrons 9 are directed to the material in the trays in an oxygen depleted environment. Preferably, the material is treated by microwaves until carbonaceous material has a volatile content of below 5 wt % and more preferably below 2 wt %. Along with the microwaves, the material in the trays is heated by a heating source, such as syngas heaters as described above with regards to the pre-heating unit. If the microwave emitters are placed above the trays, then the heaters may be placed below the trays so the rubber based material is processed at the same time by microwave energy and radiant heat.

Lower volatile content in the material after microwave treatment is an indication of a better quality carbonaceous material. It is understood that volatiles are tar like hydrocarbons that are trapped in the micro porous structure of the carbonaceous material. These hydrocarbons often require much higher temperatures to evaporate.

Preferably the material has been pre-heated sufficiently that the material readily absorbs the microwave energy. Pre-heating of the material has been found by the applicant to improve the absorption of the microwave energy by the material and therefore improve throughput of material through the system.

Once processed by the hybrid processing unit 8, the trays containing the process material pass into the post-heater module. The material may be further heated, such as heated to preferably about 400-450 C, more preferably about 450-500 C or higher. The post heating may be a heating source as described above, such as syngas heaters. The post heater module may eliminate volatile residues from the carbonaceous material.

After the post-heating module, the material and trays are generally cooled preferably under an oxygen deprived atmosphere.

A further isolation chamber 12 may be used at the exit of the hybrid processing unit 8 to isolate the cooling modules from the processing modules. For example two gate valves 23C and 23D may be used to transfer trays out of the processing module. A vacuum system and inert gas purge may be used in the isolation chamber 12 to clear any residual residual gases emitted from the processed material. Once the atmosphere has been purged the gate valve 23D may open to allow the tray to exit the isolating chamber 12 and pass to the cooling module.

The cooling module may allow the trays and the process material to cool, preferably under an oxygen deprived atmosphere. If the processed contents are exposed to oxygen while still sufficiently hot, unintended oxidation of carbonaceous may occur, which may reduce the quality of the product.

The cooling module may also include physical movement of the trays towards the start of the process so that the trays can be re-used once the processed material is emptied. With reference to the FIGURE, the trays and contents may pass through a transfer box 13 that transfers the trays to a return path including a returning tunnel section 14 and/or a cooling zone 15. Preferably there is little physical agitation of the trays during any transfer or movement to reduce dust and the carbon becoming airborne. The return path in the cooling module may be propelled by gravity, chains, sprocket chains or cables or other suitable mechanisms.

The cooling conveyor is preferably purged with nitrogen to reduce oxidation of the material from the exposure of the carbonaceous material to oxygen. The cooling conveyor may include a cooling jacket to speed the cooling of the processed material.

The processed material is preferably cooled sufficiently below about 200 C preferably below about 100 C that the material can be exposed to oxygen. The trays may be lifted for return to the start of the process with a lifting device 16, with reference to the FIGURE. The contents of the trays may be removed from the tray using a variety of mechanisms at an extraction module 18.

For example a magnetic separator 19 may remove wires, iron based contaminants and other magnetic material from the carbonaceous material picked up with a vacuum head 21. In the present example, the resulting processed (non-metallic) material may fall into a product silo 20 to be transferred elsewhere or processed further, such as being mechanically pulverized.

Once emptied, the tray may be reused such as by loading the tray with the rubber-based material.

Gaseous hydrocarbons generated and released during the pre-heating or the hybrid processing may be extracted from the pre-heating module, the hybrid processing module and/or the post-heating modules and provided to a condensing unit using a purge system. The condensing unit cools the gases.

The condensable part of the fumes may become liquid oil. Non-condensable gas may be further purified by scrubbing the gas with sodium hydroxide solution to remove hydrogen sulphide, compressed and stored, such as in a pressure vessel. The non-condensable gas may be burned and used for pre-heating, processing and post-heating modules in the system or used as a fuel source for other activities such as creating electricity.

Various embodiments of the present invention having been thus escribed in detail by way of example, it will be apparent to those skilled in the art that variations and modifications may be made without departing from the invention.

We claim:

1. A method for processing rubber-based material comprising the steps of:
   receiving rubber-based material;
   loading the rubber-based material into one or more reusable trays;
   pre-heating the rubber-based material in the one or more reusable trays using radiant heating in an oxygen depleted atmosphere to between about 100° C. to 250° C.;
   processing the pre-heated rubber-based material by applying microwaves and further heat the pre-heated rubber material in the one or more reusable trays in an oxygen depleted environment until the pre-heated rubber is substantially reduced to a processed material comprising a carbonaceous material having a volatile content of below 5 wt %;
   post-heating the processed material in the one or more reusable trays to more than about 400° C. using radiant heating in an oxygen depleted environment;
   cooling the processed material in the one or more reusable trays to less than about 200° C. in an oxygen depleted environment; and
   extracting the processed material from the one or more reusable trays.

2. The method of claim 1 wherein the rubber-based material comprises tires, cut tires, broken tires, shredded rubber, chipped rubber, crumb tires or a combination.

3. The method of claim 1 further comprising isolating the atmosphere surrounding the rubber-based material and the one or more reusable trays during the pre-heating, processing, post-heating and cooling steps.

4. The method of claim 1 wherein the one or more reusable trays are metal trays.

5. The method of claim 1 wherein the one or more reusable trays are individually identifiable and traceable.

6. The method of claim 1 wherein an inert gas is introduced to the pre-heating, processing, post-processing and cooling steps to create the oxygen depleted atmosphere or environment.

7. The method of claim 1 further comprising extracting any vapours and/or gases emitted during the steps of pre-heating, processing and/or post-heating, thereafter cooling and condensing the extracted vapours and/or gases.

8. The method of claim 1 wherein the processing the pre-heated rubber-based material comprises heating the carbonaceous material until having a volatile content of below 2 wt %.

9. The method of claim 1 wherein the cooling the processed material comprises cooling the processed material in the one or more reusable trays to less than about 100° C.

10. The method of claim 6 wherein inert gas is nitrogen.

* * * * *